Jan. 8, 1952 W. S. PRAEG 2,581,700
APPARATUS FOR FINISHING GEARS
Filed Aug. 11, 1947 3 Sheets-Sheet 3
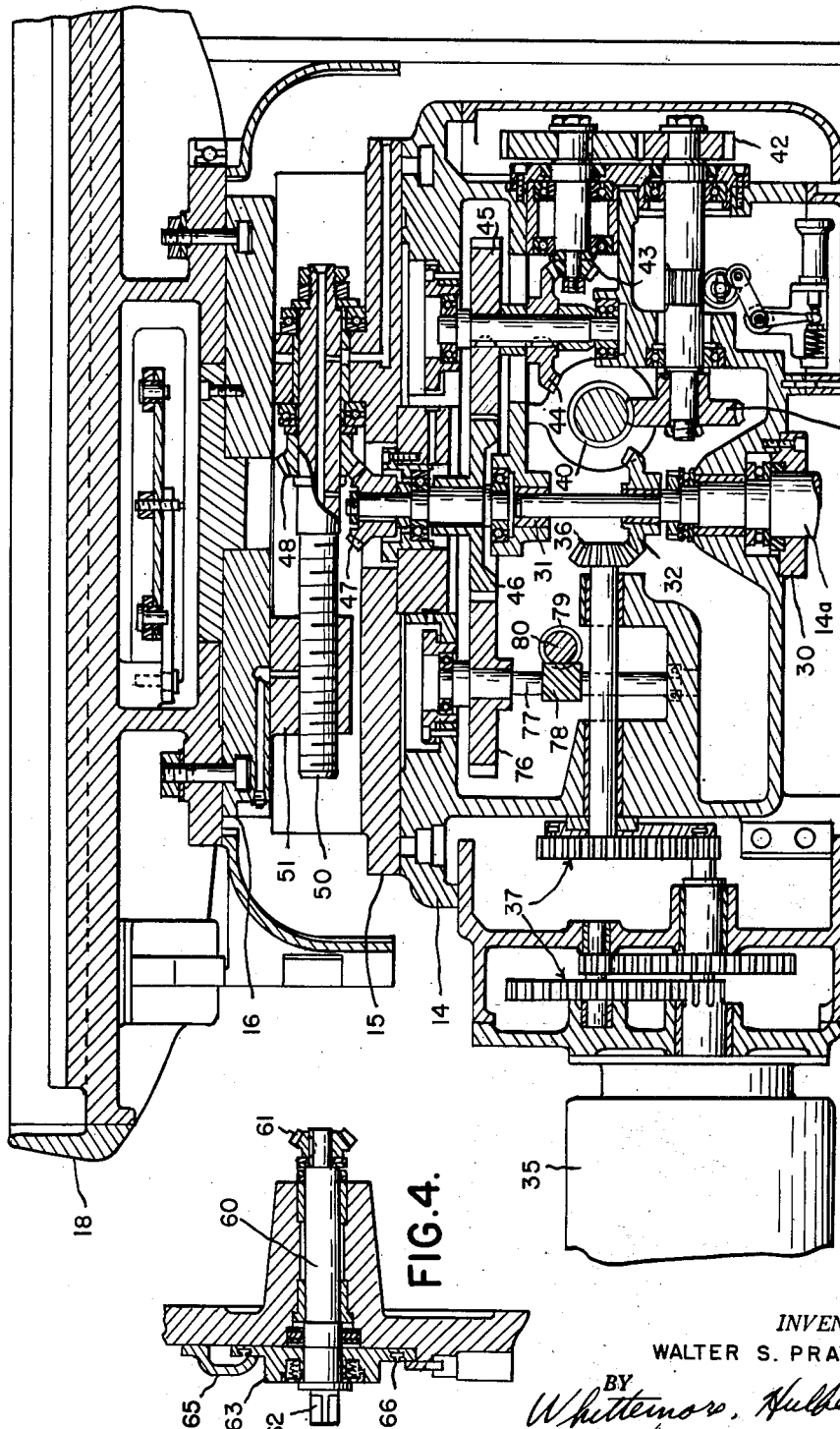
INVENTOR.
WALTER S. PRAEG
BY
Whittemore, Hulbert
& Belknap
ATTORNEYS Patented Jan. 8, 1952

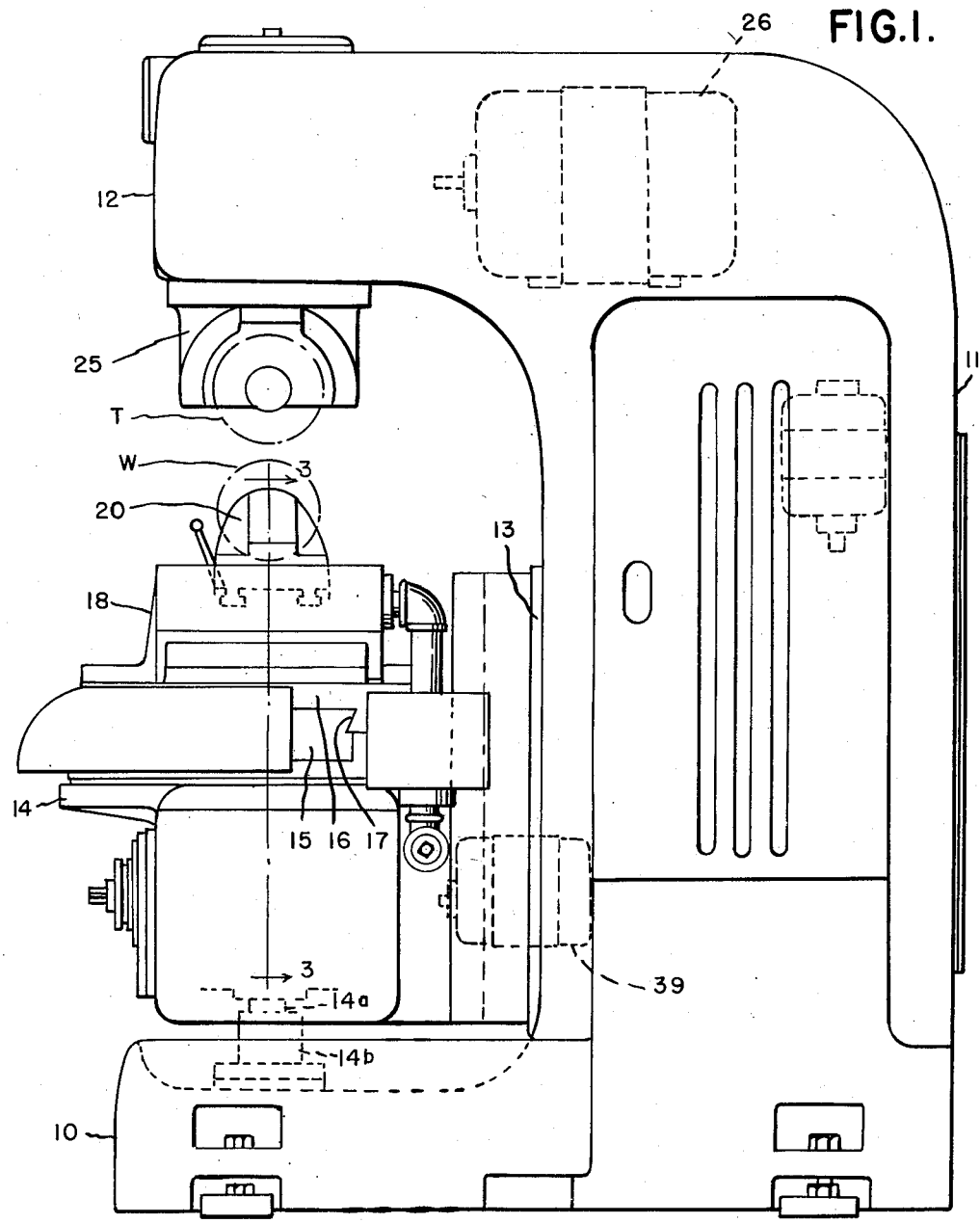

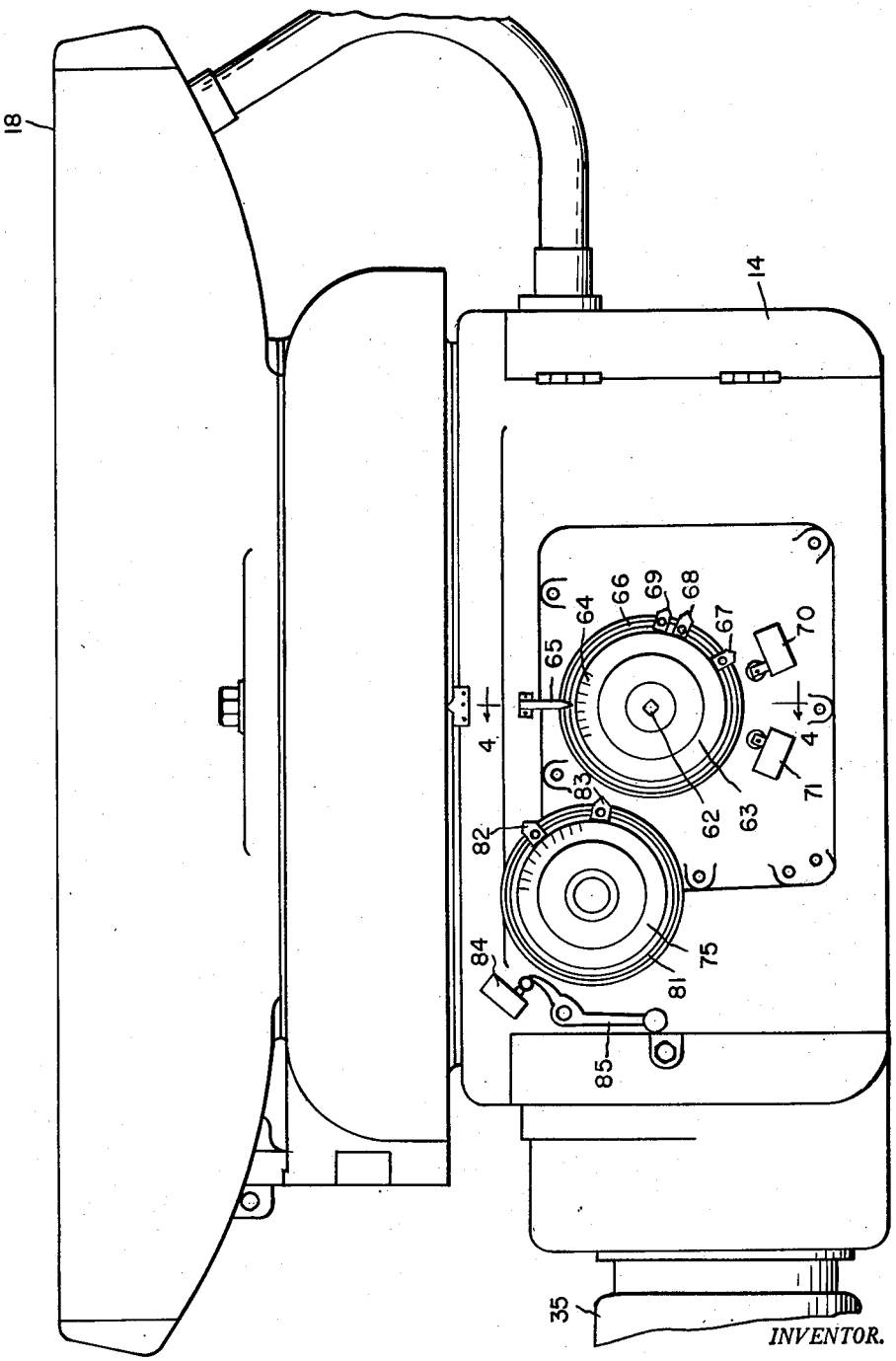

2,581,700

UNITED STATES PATENT OFFICE 2,581,700

APPARATUS FOR FINISHING GEARS

Walter S. Praeg, Detroit, Mich., assignor to National Broach & Machine Company, Detroit, Mich., a corporation of Michigan Application August 11, 1947, Serial No. 768,055

4 Claims. (Cl. 90—1.6)

The present invention relates to gear finishing and more particularly to method and apparatus for shaving gears by a process defined as diagonal shaving.

For a more complete exposition on the underlying principles and fundamental considerations in use, attention is directed to my prior copending application, Serial No. 694,590, filed September 3, 1946. However, for completeness of the present specification a brief resume will be given.

Gear shaving by diagonal traverse is carried out by employing a gear-like finishing tool which preferably has teeth provided with serrations extending from top to bottom so as to form cutting edges therein. However, in its broader application the invention may be practiced with another type of finishing tool, such for example as a gear-like lap, in which case the cutting action is the result of abrasive particles supplied between the meshing teeth of the gear and tool.

The gear and gear-like tool are positioned in mesh with their axes both parallel to a common reference plane but extending at an angle to each other, this angle being commonly referred to as the angle of crossed axes. This angle may vary considerably but for best results will be between 2° and 15°.

Either the gear or the gear-like tool is positively driven in rotation, the other of these members being driven through their intermeshing engagement. The rate of rotation may be varied substantially but best results are obtained when the rotation is such as to produce a pitch line surface speed of between 200 to 1,000 surface feet per minute, and excellent results are obtained when the surface speed of the gear and gear-like tool is in the neighborhood of 500 surface feet per minute.

Inasmuch as the gear and gear-like tool are disposed with their axes crossed, the theoretical contact between the teeth of the gear and tool is a point contact and will lie substantially in a plane containing the common normal to the axes of the gear and tool. In practice this theoretical point contact becomes a contact over a limited area due to compression of metal, surface irregularities, the serrated formation of the cutter teeth and other considerations. Rotation of the gear and tool in tight mesh with their axes crossed as above described and without other relative motion produces a narrow finished zone on the teeth of the gear. In order to extend this finished zone from end to end of the gear teeth an additional relative motion, referred to herein as feeding traverse, is required. This feeding traverse takes place in the reference plane above described and extends in such plane at a substantial angle to the axis of both the gear and the tool. The direction which relative traverse makes with the axis of the work gear is referred to herein as the traverse angle, and this angle will in all cases be less than 60° and will preferably be between 10° and 45°. As a result of the relative traverse referred to the common normal to the axes of the gear and cutter (referred to herein as the center of crossed axes) is caused to shift progressively from one end to the other of the teeth of the work gear and at the same time a relative shifting of the center of crossed axes occurs with respect to the teeth of the tool. This offers numerous advantages more fully pointed out in my prior copending application, among these being the fact that the wear is distributed over a band of substantial width on the teeth of the tool rather than being limited to a narrow annular zone thereon as would occur if the relative traverse were in a direction parallel to the axis of the gear.

It is the object of the present invention to teach a new method and to disclose new apparatus for carrying out the finishing of gears by diagonal traverse as above described in a new and improved manner, and the invention has among its features the provision of relative depth feeding in a definite relation to traverse so as to obtain full benefit of the extremely rapid stock removal resulting from diagonal traverse.

More specifically, it is an object of the present invention to provide a method and appparatus for finishing gears by diagonal traverse which includes the steps of and means for effecting depth feed between strokes of traverse.

It is a further object of the present invention to shave gears by diagonal traverse by the provision of means for and the steps of effecting a relative depth feed between the gear and tool from a loading position to an initial traverse position, thereafter effecting a single back and forth traverse and thereafter causing a reverse depth feed to separate the gear and cutter and to position them again in loading position.

It is a further object of the present invention to shave gears by diagonal traverse by the provision of means for and the steps of effecting a relative depth feed between the gear and tool from a loading position to an initial traverse position, thereafter effecting a single stroke of traverse to cause the center of crossed axes to shift progressively from one side to the other of said gear member, thereafter effecting a second relative depth feed, preferably in an amount to provide for a reduced stock removal during the next stroke of traverse, thereafter reversing the traverse stroke, and finally reversing the relative depth feed to separate the gear and cutter to loading position.

Other objects and features of the invention will become apparent as the description proceeds, especially when considered in conjunction with the accompanying drawings, wherein:

Figure 1 is a side elevation of a machine for carrying out the herein disclosed methods of gear finishing;

Figure 2 is a fragmentary front elevation of the machine shown in Figure 1 on an enlarged scale;

Figure 3 is a fragmentary vertical section on the line 3—3 of Figure 1; and

Figure 4 is a fragmentary vertical section on the line 4—4 of Figure 2.

The present invention is illustrated as applied to a gear shaving machine of the type fully described in prior application, Serial No. 694,590, filed September 3, 1946, in the name of Kenneth J. Davis and assigned to the assignee herein. For details of the machine which are not described herein, reference is made to the prior copending application.

Briefly described, the machine comprises a frame including a forwardly extending base 10, a column 11 and an overhanging forwardly projecting arm 12. At the front of the column 11 are vertically extending ways indicated at 13 on which a knee 14 is mounted for vertical adjustment. Means are provided for effecting vertical adjustment of the knee 14 and comprise a vertical feed screw 14a which is rotatable in a fixed feed nut 14b. Mounted for rotation on the top of the knee are a pair of plates 15 and 16 which are formed with cooperating rectilinear ways 17 extending therebetween. The lowermost plate 15 is mounted for adjustment about a vertical axis. Mounted on the top of the upper plate 16 for adjustment about a vertical axis is a work supporting table 18. Means later to be described are provided for effecting a slow relative traverse between the plates 15 and 16 and in an intermediate position of relative traverse between these plates, the vertical axis about which the table 18 is adjustable on the plate 16 coincides with the vertical axis about which the lower plate 15 is adjustable on the knee 14. Preferably a linkage arrangement is provided for retaining the table 18 against swivel or rotational movement about a vertical axis while at the same time permitting it to move simultaneously with the upper plate 16 along the ways 17 in whatever position of adjustment the ways may be. The table 18 is provided with a suitable head and tailstock, one of these being indicated at 20, for supporting a work gear indicated generally at W for free rotation.

The overhanging forwardly projecting arm 12 is provided with a depending cutter support 25 which is adjustable about a vertical axis, this axis coinciding with the vertical axes of adjustment of the plate 15 and the table 18 when the parts are in a centralized or intermediate position. The cutter support 25 is adapted to mount a rotary tool or gear-like cutter T, and means are provided for effecting positive rotation of the tool T in the various positions of adjustment of the cutter support 25. This means is not disclosed herein and may be of the type described in prior patent to Robert S. Drummond, No. 2,270,422, dated January 20, 1942. It is noted, however, that a motor 26 is provided for effecting rotation of the tool T.

Referring now to Figure 3, the means for effecting vertical movement of the knee 14 and for effecting traverse of the table 18 is shown.

The vertical feed screw 14a supports the knee 14, suitable bearing and supporting structure being indicated at 30. The upper end of the feed screw is reduced and is received within a bearing 31. Keyed or otherwise secured to the upper reduced end of the feed screw 14a is a bevel gear 32. It will be apparent that rotation of the bevel gear 32 effects vertical movement of the knee 14, and motor means are provided for effecting such rotation. A motor 35 is mounted at the side of the knee and drives a bevel gear 36 meshing with the bevel gear 32 through a plurality of speed reducing gears indicated generally at 37. The motor 35 is of two-speed or variable speed type, for a purpose which will subsequently appear.

A separate motor 39 is connected to a drive shaft carrying a worm 40 which meshes with a worm gear 41. The worm gear 41, through gears 42, bevel gears 43, 44, drive gears 45, 46 and bevel gears 47, 48, drives a traverse screw 50 which is supported for rotation and held against endwise movement on the lower plate 15. Depending from the underside of the upper plate 16 is a feed nut 51 which threadedly engages the feed screw 50 so that rotation of the feed screw effects relative traverse between the plates 15 and 16 along the direction of the ways 17, the feed screw 50 being provided in parallelism with such ways.

Extending to the front of the machine is a short shaft 60, best illustrated in Figure 4, carrying a bevel gear 61 which is adapted to mesh with the bevel gear 32, and accordingly rotation of the shaft 60 is in accordance with vertical movement of the knee 14. The shaft 60 is provided with a squared end 62 for engagement by a suitable hand tool for effecting manual vertical adjustment of the knee when the motor drive is disengaged. Keyed or otherwise secured to the shaft 60 is a disk 63 carrying indicia on its forward face, as indicated at 64, which cooperates with an indicator or pointer 65. The disk 63 is further provided with a circular T-slot 66 in which are adjustably supported a plurality of switch actuators 67, 68 and 69. Mounted at the front of the machine in position to be engaged by the switch actuators are a pair of limit switches 70 and 71.

On the front of the knee 14 there is provided a second switch actuating dial plate 75 which is adapted to be rotated in accordance with horizontal traverse of the table 18. To effect rotation of the dial plate 75 a gear 76 is provided which meshes with the gear 46 and which rotates a shaft 77 carrying a worm 78 meshing with a worm gear 79 carried by a shaft 80 which extends forwardly to and is interconnected in driving relation with the dial plate 75.

The dial plate 75, like the dial plate 65, is provided with a circular T-slot 81 in which are mounted a pair of adjustable switch actuators 82 and 83. Mounted on the front of the machine in position to be engaged by the switch actuators is a limit switch 84 which includes a manual actuating lever 85 so that traverse of the machine may be manually controlled if desired. The present control instrumentalities, including limit switches 70, 71 and 84 and the adjustable switch actuating dogs 67, 68, 69, 82 and 83, provide means for carrying out various specific methods of gear finishing.

It has been found that gear shaving by diagonal traverse results in such rapid and accurate removal of stock that commercial gear shaving operations normally require a single back and forth stroke of traverse. In some cases, and particularly as disclosed in the prior copending application, Serial No. 714,925, in the name of Max B. Mentley, filed December 9, 1946 and assigned to the assignee herein, the method of gear shaving may be carried out without effecting vertical adjustment, or in other words relative depth feed between the gear and tool. However, in other cases such depth feed is desirable, and the present invention teaches the manner in which depth feed should be carried out and provides apparatus for carrying out depth feed in the manner prescribed.

As a preferred method of shaving gears by diagonal traverse which incorporates relative depth feed, it is assumed that the table 18 is at rest in loading position (relative to traverse) such that the center of crossed axes between the gear mounted on the table and the tool mounted on the tool support 25 lies outside the sides of the gear member. The gear and tool, however, are in loose mesh and will remain in loose mesh after relative depth feed is taken up. Relative depth feed is carried out by a vertically upward movement of the table 18 to a position corresponding to a predetermined depth of cut. In the initial loading position a gear may be mounted upon the gear support in loose mesh with the cutter and the cycle initiated by closing a suitable starting switch. The starting switch will start rotation of the depth feed motor 35, effecting vertically upward movement of the table 18 from loading position to initial traverse position. Upward movement of the table 18 is accompanied by rotation of the dial 64 and continues until one of the dogs, for example 68, actuates one of the limit switches, for example 71. Actuation of the limit switch 71 is effective to stop rotation of the motor 35 and to initiate rotation of the traverse motor connected to the worm 40. This results in the first stroke of traverse of the table 18 together with the upper plate 16 along the ways 17. This traverse is accompanied by a corresponding rotation of the dial 75 as previously described and continues until such time as one of the dogs, as for example 83, actuates the limit switch 84. The limit switch 84 is suitably connected so as to stop and reverse rotation of the traverse motor, reverse rotation of the tool drive motor 26, and at the same time to again energize the depth feed motor 35. During the brief interval while the traverse motor is being brought to a stop and reversed, the depth feed motor 35 again feeds the table 18 upwardly until another of the adjustable dogs, as for example 69, trips one of the limit switches, for example 71. A second actuation of the limit switch 71 stops rotation of the depth feed motor 35 but the second depth feed step referred to takes place so quickly that it is completed before return traverse of the table 18 is initiated. If, however, it were considered desirable the wiring circuit could be arranged so that actuation of the limit switch 84 stops rotation of the traverse motor and its reverse rotation initiated by the second actuation of the limit switch 71.

The reverse traverse of the table 18 continues until such time as the limit switch 84 is tripped by the other dog 82. This stops rotation of the traverse motor and initiates reverse rotation of the depth feed motor 35, thus causing the table 18 to move downwardly to loading position. Downward movement of the table 18 is accompanied by reverse rotation of the dial 64 and continues until the limit switch 70 is tripped by the dog 67, thus completing the cycle.

In some cases the second depth feed, which as described above took place at the end of the first stroke of traverse, may be omitted; in which case actuation of the switch 84 by the dog 83 is effective to reverse rotation of the traverse motor but does not initiate the second depth feed by energizing the motor 35.

It was previously stated that the depth feed motor 35 preferably was a variable speed or two-speed motor, and this affords the possibility of an initial depth feed with the gear and tool in such initial loading position that movement from loading position to initial traverse position is accompanied by some stock removal. This occurs when the center of crossed axes at loading position is at or closely adjacent to one edge of the gear to be finished, and in the event that the gear is substantially over-sized there will be stock removal during the relative depth feed, thus requiring a slower relative depth feed than would otherwise be the case. However, the loss of time in the slower relative depth feed may be more than compensated for by the resulting shortening of the traverse stroke. In this case a suitable speed controlling relay is provided in the circuit which insures that the initial depth feed from loading position to initial traverse position takes place at a slow or feeding speed. This relay may be locked out upon completion of the initial depth feed, or if desired may be left in and locked out upon completion of the second depth feed which occurs at the end of the first traverse stroke. In any event, relay will be locked out so that reverse depth feed or separation between the gear and tool at the end of the cycle may take place at the more rapid rate.

Inasmuch as the circuits referred to in carrying out the various operations above described are conventional and may be laid out by any competent electrician, it has been deemed unnecessary to illustrate and describe these circuits in detail in the present case.

While for convenience a wholly electrical control system for effecting the various feed and traverse steps has been illustrated, it will be apparent that other mechanism could be provided. The electrical control system is preferred, however, due to its extreme flexibility and due to the fact that it requires no mechanical changes of parts in order to change from one method to another. However, it will be readily apparent that if desired any of the methods referred to could be carried out in its entirety by employing a constantly or intermittently rotating cam for effecting vertical movement of the table 18 as required during the cycle.

Briefly reviewed, the several methods which the present apparatus has been designed to carry out and which specific methods are within the scope of the present invention, are as follows:

(1) The gear support in loading position is also in initial traverse position so that when the gear is mounted upon its support the cycle consists of a first traverse stroke to cause the center of crossed axes to shift from one side of the gear to the other, a relative depth feed, a return traverse stroke, and a reverse depth feed equal in amount to the depth feed which took place at the end of the first traverse stroke.

(2) The gear support in loading position is beneath its initial traverse position. In this case, after the gear is mounted on the work support the cycle consists of a relative depth feed from loading position to initial traverse position, a first traverse stroke to cause the center of crossed axes to shift from one side of the gear to the other, a second traverse stroke without intermediate depth feed to cause the center of crossed axes to shift back to the first side of the said gear, and a reverse depth feed or separation to return the work gear to loading position.

(3) The second method described above may be modified to include relative depth feed between the first and second traverse strokes, in which case the cycle consists of a relative depth feed from initial loading to initial traverse position, a first traverse stroke to cause the center of crossed axes to shift from one side of the gear to the other, a second relative depth feed, a second reverse traverse stroke to cause the center of crossed axes to shift reversely across the width of the gear at the original side, and a reverse relative depth feed to cause separation between the gear and tool and to position the gear support in loading position.

(4) In the event that the relative traverse position of the gear is such that the center of crossed axes is at or closely adjacent to one edge of the gear, it may be necessary for the initial depth feed to take place at a slower or feeding rate since a portion of this depth feed will constitute a cutting stroke. In this case the cycle consists of a relatively slow relative depth feed from loading to initial traverse position, a first traverse stroke to cause the center of crossed axes to shift from one side of the gear to the other, a second relative depth feed which may be relatively slow or relatively fast depending upon whether the first stroke of traverse is terminated with the center of crossed axes substantially at or adjacent the opposite edge of the gear or is terminated with the center of crossed axes spaced somewhat further outwardly from the edge of the gear, a reverse traverse to cause the center of crossed axes to shift back across the face of the gear to its original side, and a relatively rapid reverse depth feed to cause separation between the gear and tool and to return the gear to loading position.

Reference was previously made to the extremely rapid rate of stock removal inherent in gear finishing when diagonal traverse is employed. Experiment has indicated that in some cases, depending in part upon the material of the gear being machined and in part upon other considerations, when the machining operation is carried out without the intermediate relative depth feed at the end of the first traverse stroke, there is an undesirable variation in the reproduction of involutes on opposite sides of the gear teeth. This can be compensated for by the initial grinding of the cutter so as to provide different profiles on opposite sides of the teeth. This, however, renders the tool grinding operation somewhat more difficult and it is found that when a proper division of stock removal is made between the first and second traverse strokes this difficulty may be avoided. It is found that the amount of stock removed during the second or return traverse stroke should ordinarily be in the neighborhood of a half of the stock removal effected during the first stroke of traverse, although this varies. However, in all cases it is found that the amount of stock removal during the second or return traverse stroke should be between ten percent and eighty percent of the amount of stock removed during the first stroke of traverse.

The drawings and the foregoing specification constitute a description of the improved method and apparatus for finishing gears in such full, clear, concise and exact terms as to enable any person skilled in the art to practice the invention, the scope of which is indicated by the appended claims.

What I claim as my invention is:

1. A gear shaving machine comprising a base, a rotary work support on said base, a rotary tool support on said base, means for effecting angular adjustment between said supports about an axis perpendicular to the axes of both supports, a first feed screw and nut mechanism for feeding one of said supports in a direction perpendicular to the axes of both supports, a first reversible motor for actuating said first mechanism, a second feed screw and nut mechanism for traversing one of said supports in a plane parallel to the axes of said supports, a second reversible motor for actuating said second mechanism, a third reversible motor for rotating one of said supports, control means comprising means for energizing said first motor to cause relative approach between said supports, means responsive to predetermined spacing between said supports to stop said first motor and energize said second and third motors, means responsive to predetermined traverse between said supports to reverse said second and third motors, means responsive to predetermined reverse traverse between said supports to stop said second and third motors and to energize said first motor in the reverse direction, and means responsive to predetermined separation between said supports to stop said first motor, ending a cycle.

2. A machine as defined in claim 1 in which said last means is constructed and arranged to stop said first motor when said supports are separated by an amount which positions a gear and gear-like cutter carried thereby in mesh but with substantial backlash therebetween.

3. A gear shaving machine comprising a base, a rotary work support on said base, a rotary tool support on said base, means for effecting angular adjustment between said supports about an axis perpendicular to the axes of both supports, a first feed screw and nut mechanism for feeding one of said supports in a direction perpendicular to the axes of both supports, a first reversible motor for actuating said first mechanism, a second feed screw and nut mechanism for traversing one of said supports in a plane parallel to the axes of said supports, a second reversible motor for actuating said second mechanism, a third reversible motor for rotating one of said supports, control means comprising means for energizing said first motor to cause relative approach between said supports, means responsive to predetermined spacing between said supports to stop said first motor and energize said second and third motors, means responsive to predetermined traverse between said supports to re-energize said first motor and to reverse said second and third motors, means responsive to a second predetermined spacing between said supports to stop said first motor, means responsive to predetermined reverse traverse between said supports to stop said second and third motors and to energize said first motor in the reverse direction, and means responsive to predetermined separation between said supports to stop said first motor, ending a cycle.

4. A machine as defined in claim 3 in which all of said control means are adjustable to vary the depth of cuts on forward and reverse traverse strokes, the length of traverse stroke, and the backlash between a gear and gear-like tool carried by said supports between successive cycles.

WALTER S. PRAEG.

REFERENCES CITED

The following references are of record in the file of this patent:

UNITED STATES PATENTS

| Number | Name | Date |
|---|---|---|
| 2,123,717 | Dalzen | July 12, 1938 |
| 2,267,692 | Dalzen | Dec. 23, 1941 |
| 2,270,421 | Drummond | Jan. 20, 1942 |
| 2,270,422 | Drummond | Jan. 20, 1942 |
| 2,350,882 | Drummond | June 6, 1944 |
| 2,380,261 | Praeg | July 10, 1945 |

FOREIGN PATENTS

| Number | Country | Date |
|---|---|---|
| 480,247 | Great Britain | Feb. 14, 1938 |